J. F. WARNER.
POWER TRANSMISSION DEVICE.
APPLICATION FILED SEPT. 18, 1917.
1,319,497. Patented Oct. 21, 1919.
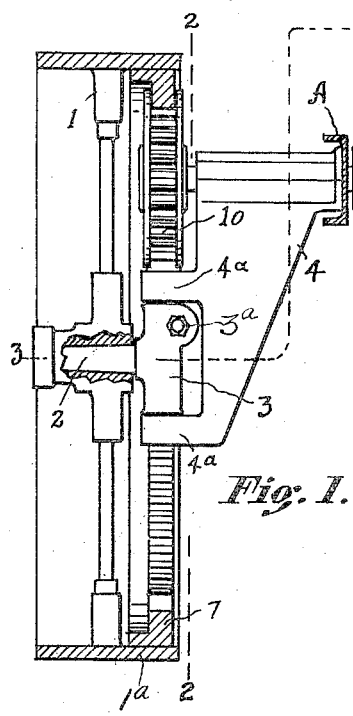
*Fig. 1.*
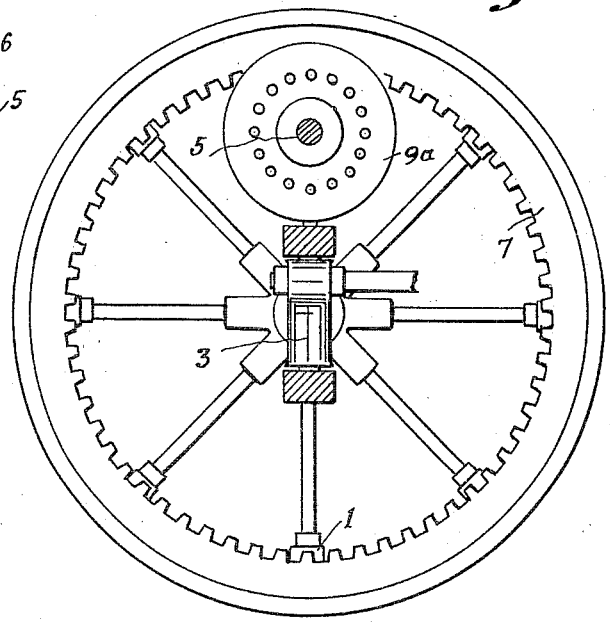
*Fig. 2.*
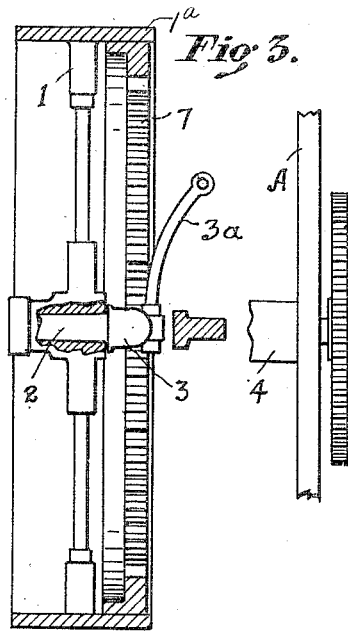
*Fig. 3.*
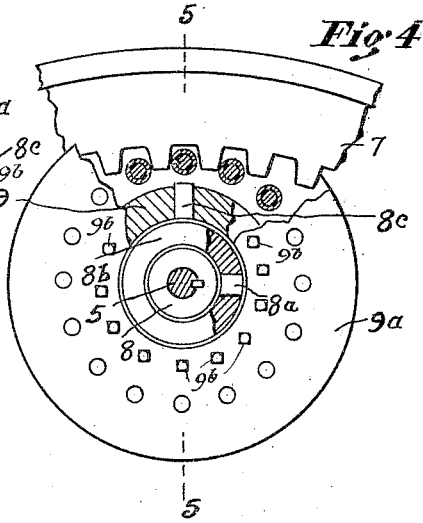
*Fig. 4.*
*Fig. 5.*
WITNESSES:
INVENTOR
JOHN FRAZER WARNER
By
ATTORNEY.

UNITED STATES PATENT OFFICE.

JOHN FRAZER WARNER, OF MUNCIE, INDIANA.

POWER-TRANSMISSION DEVICE.

1,319,497.      Specification of Letters Patent.      Patented Oct. 21, 1919.

Application filed September 18, 1917. Serial No. 191,916.

*To all whom it may concern:*

Be it known that I, JOHN FRAZER WARNER, a citizen of the United States, residing at Muncie, in the county of Delaware and State of Indiana, have invented certain new and useful Improvements in Power-Transmission Devices, of which the following is a specification.

This invention relates to improvements in power transmitting devices, for use in self propelled vehicles intended for drawing heavy loads and operating over uneven surfaces and where traction is difficult.

In self propelled vehicles of the class referred to, such as vehicles for the drawing of plow shares and other cultivating devices, it is desirable that the driving power may be applied directly to the traction wheels of the vehicle so that the said drawn devices may be drawn or propelled in the most effective manner.

In this invention there is contemplated the arrangement, in combination with the frontal traction wheel journaled on the usual pivoted steering knuckle, of an annular rack carried by the traction wheel, a driving shaft journaled adjacent to said traction wheel and which shaft is actuated by suitable power transmitting devices carried by the vehicle, a gear wheel to mesh with said rack, and a universal connection between the gear wheel and the driving shaft.

The objects of the present invention are accomplished by, and the invention is embodied in the mechanism described in the following specification and illustrated in the accompanying drawings.

In the drawings, the different parts of the invention are identified by suitable characters of reference applied thereto, in the several views, in which—

Figure 1 is a front view of my invention.

Fig. 2 is a sectional view taken on the line 2—2 in Fig. 1, and viewed in the direction indicated by the arrow 2.

Fig. 3 is a sectional top plan view taken on the line 3—3 in Fig. 1.

Fig. 4 is an enlarged detail view of the universal connection between the driving shaft and the traction wheel gearing.

Fig. 5 is a transverse vertical sectional view taken on the line 5—5 in Fig. 4.

The traction wheel 1 is journaled on the usual spindle 2. The spindle shank 3 has its upper and lower ends journaled in the heads $4^a$ of the frame block 4.

This frame block 4 is of the substantial form and structure shown and is securely fastened to the member A of the vehicle frame. In the upper portion of the frame block 4 is journaled a shaft 5. On the inner end of this shaft is secured a sprocket wheel 6. By means of a chain belt (not shown) power may be transmitted from a sprocket wheel operable from the shafts of the differential gearing (not shown) and by which the shafts 5 are driven.

Arranged and secured on the underside of the tread or tire portion $1^a$ of the traction wheel, is the annular rack 7. Secured on the shaft 5 is a head 8 of rounded form and being provided with studs $8^a$. Journaled on studs $8^a$ is a universal ring $8^b$ having studs $8^c$. Journaled on the studs $8^c$ is a ring-shaped member 9 which may be designated as a hub ring. Circular wall plates $9^a$ are secured by bolts $9^b$ to the sides of this hub ring 9 and are provided with a succession of roller bearings or teeth 10 which are adapted to mesh with the teeth of the rack 7. These wall plates are spaced at such distance apart that suitable clearance for free action between same and the sides of the rack 7 is provided. The structure just described comprising the hub-ring 9, wall plates $9^a$ and the teeth 10 may be designated as a sheave-wheel.

It will be understood that the center line of the head 8 is in alinement with the center of the spindle shank or knuckle 3.

By reason of the connection between the driving shaft 5 and the hub-ring 9 of the sheave wheel being universal, and because the hub-ring engagement of the wall plates $9^a$ with the sides of the rack 7 is constant, there is the universal and constant transmission of power from the shaft 5 to the traction wheel. It is apparent that the power thus so directly transmitted exerts a powerful driving energy to the traction wheel. The preferred form of combination of the sheave-wheel and driven wheel contemplates the use of a rack of the internally toothed form. This arrangement affords a maximum of contact area between the wall plates and the sides of the rack, and the most advantageous effect of the wall plates as alinement members is thereby obtained. These wall plates perform the function of maintaining the sheave wheel in engagement with the rack on the line transverse to the wheel axis, and also in engagement with the rack, at the oscillated positions.

The arms 3ª extending from the spindle shank 3 afford usual connections for the steering mechanism (not shown) and by which the spindles are swung to different positions in the guiding of the vehicle. The hub ring 9 being in universal alinement as hereinbefore described, there is at all times a direct, uniform, and dependable transmission of the power from shaft 5, and the maximum of energy afforded by the said shaft 5 is obtained. By the use of this mechanism it is possible to obtain transmission of the vehicle driving power directly to the tractor portion of the traction wheels, thereby increasing the tractive properties of the vehicle and without the expenditure of extraordinary driving power.

While I have shown this invention arranged in combination with a traction wheel that is journaled on an oscillatory spindle, it is operable also at the traction wheel which is journaled on a fixed spindle. I am also aware that minor changes may be made in the construction and arrangement of the several parts without affecting the nature of the invention or sacrificing any of its advantages.

What I claim as my invention, and desire to secure by Letters Patent, is:

1. In combination with the frame, an oscillatable spindle thereon, a traction wheel journaled on the spindle, an annular internally toothed rack carried by the traction wheel, a driving shaft mounted with its axis at a right angle to the vertical axis of the said oscillatable spindle, a hubbed sheave wheel toothed to mesh with the said annular rack and having its walls to engage the sides of said annular rack, a primary ring secured on the driving shaft and having journal studs transverse to the axial line of the driving shaft, and a secondary ring journaled on the studs of the primary ring and having studs journaled in the hub of the said sheave-wheel, substantially as described.

2. In combination with the frame, an oscillatable spindle thereon, a traction wheel journaled on the spindle, an annular internally toothed rack carried by the traction wheel, a driving shaft, a hubbed sheave-wheel toothed to mesh with said annular rack and having its walls to engage the sides of said annular rack, and a universal connection between the driving shaft and the said sheave-wheel, substantially as described.

3. A power transmission mechanism of the kind described, comprising a frame, an oscillatable spindle thereon, a traction wheel journaled on the spindle, a driving shaft, a hubbed wheel, a primary ring secured on the driving shaft and having journal studs transverse to the axial line of the driving shaft, and a secondary ring journaled on the studs of the primary ring and having studs journaled in the hub of the said hubbed wheel, power transmitting connections between the hubbed wheel and the traction wheel, and connections to cause the hubbed wheel to oscillate with the traction wheel.

4. In combination with the frame, an oscillatable spindle thereon, a traction wheel journaled on the spindle, an annular internally toothed rack carried by the traction wheel, a driving shaft, a primary ring secured on the driving shaft and having journal studs transverse to the axis of said shaft, a secondary ring journaled on the studs of the primary ring and having journal studs transverse to the axis of the driving shaft, a hub ring journaled on the studs of the secondary ring, wall plates secured to the sides of the hub-ring and adapted to engage the sides of the annular rack, and transverse teeth arranged between the said wall plates, to mesh with the teeth of said annular rack.

In testimony whereof I affix my signature in the presence of two witnesses.

JOHN FRAZER WARNER.

Witnesses:
DONALD D. HENSEL,
FREDERICK F. MCCLELLAN.

Copies of this patent may be obtained for five cents each, by addressing the "Commissioner of Patents, Washington, D. C."